United States Patent
Liu et al.

(10) Patent No.: US 9,767,489 B1
(45) Date of Patent: Sep. 19, 2017

(54) CONTENT ITEM IMPRESSION EFFECT DECAY

(71) Applicant: Google Inc., Mountain View, CA (US)

(72) Inventors: Yifang Liu, Redwood City, CA (US); Konstantinos Katsiapis, Palo Alto, CA (US); Christopher Kenneth Harris, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 503 days.

(21) Appl. No.: 14/032,169

(22) Filed: Sep. 19, 2013

Related U.S. Application Data

(60) Provisional application No. 61/872,412, filed on Aug. 30, 2013.

(51) Int. Cl.
G06Q 30/02 (2012.01)
H04L 29/08 (2006.01)
G06F 17/30 (2006.01)

(52) U.S. Cl.
CPC ...... *G06Q 30/0277* (2013.01); *G06F 17/30867* (2013.01); *G06Q 30/0241* (2013.01); *G06Q 30/0249* (2013.01); *G06Q 30/0253* (2013.01); *H04L 67/32* (2013.01)

(58) Field of Classification Search
CPC .......... G06Q 30/0241; G06Q 30/0249; G06Q 30/0253; G06Q 30/0277; G06F 17/30867
See application file for complete search history.

(56) References Cited

U.S. PATENT DOCUMENTS

| | | | |
|---|---|---|---|
| 6,772,129 B2 | 8/2004 | Alvarez et al. | |
| 8,423,406 B2 | 4/2013 | Briggs | |
| 8,438,170 B2 | 5/2013 | Koran et al. | |
| 8,577,726 B1* | 11/2013 | Betz | G06Q 30/0244 705/14.69 |
| 2006/0041480 A1* | 2/2006 | Briggs | G06Q 30/02 705/14.41 |
| 2008/0275757 A1* | 11/2008 | Sharma | G06Q 10/063 705/7.29 |
| 2010/0161378 A1* | 6/2010 | Josifovski | G06Q 30/0243 705/14.42 |
| 2013/0018719 A1 | 1/2013 | Abraham et al. | |
| 2013/0091011 A1* | 4/2013 | Young, III | G06Q 30/0241 705/14.45 |
| 2014/0067527 A1* | 3/2014 | Schussel | G06Q 30/0251 705/14.49 |

FOREIGN PATENT DOCUMENTS

WO    WO-2013/036957    3/2013

* cited by examiner

*Primary Examiner* — Aaron Strange
(74) *Attorney, Agent, or Firm* — Foley & Lardner LLP; John D. Lanza; James De Vellis

(57) ABSTRACT

When a content item is initially served to a client device, the content item may result in an impression effect. As time elapses, the initial impression may fade. Such a decay of the impression effect may be predicted through the use of a predictive model. In some implementations, one or more impression effect parameters may be accessed and used with the predictive model to determine a decay factor or predicted value that incorporates the impression effect decay for a content item. A value, such as a score, may be determined based on the decay factor or the predicted value and a bid associated with a content item. A content item may be selected based on the determined value and data to effect presentation of the content item may be provided.

19 Claims, 8 Drawing Sheets

CONTENT ITEM IMPRESSION EFFECT DECAY

CROSS-REFERENCE TO RELATED PATENT APPLICATIONS

This application claims the benefit of U.S. Provisional Application No. 61/872,412, entitled "Content Item Impression Effect Decay," filed Aug. 30, 2013, the disclosure of which is incorporated by reference herein in its entirety.

BACKGROUND

In a networked environment, such as the Internet or other networks, first-party content providers can provide information for public presentation on resources, for example webpages, documents, applications, and/or other resources. The first-party content can include text, video, and/or audio information provided by the first-party content providers via, for example, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For example, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to modeling an impression effect and the decay thereof. The modeling of the impression effect and the decay may be used in determining whether to select a content item, such as through the use of a predictive model. For example, after a content item, for example an advertisement, is served to be presented with a resource to a user, the content item may have an effect on the user viewing the content item, such as an impression effect. As time elapses, the effect of the impression fades as the user may forget about the content item. Such an impression effect may be used to initially reduce the likelihood that the content item is selected and served soon after an initial impression, but, as time elapses or decays, the impression effect may reduce such that the likelihood of the content item being selected and served increases.

One implementation relates to a method of selecting and serving a content item based on a decay of an impression effect for the content item. The method includes accessing one or more impression effect parameters stored in a data structure. A decay factor of an impression effect for a content item is determined using the impression effect decay predictive model and the accessed one or more impression effect parameters. A value for the content item may be determined based, at least in part, on the decay factor and a bid associated with the content item. The content item may be selected based, at least in part, on the determined value. Data to effect presentation of the selected content item may be provided.

Another implementation relates to a system for serving content items in content item slots. The system may include one or more processing modules and one or more storage devices. The one or more storage devices includes instructions that cause the one or more processing modules to perform several operations. The operations include accessing prior impression effect parameters stored in a data structure. The prior impression effect parameters may be associated with a client device, a resource, or a content item. The operations may include generating an impression effect decay predictive model based, at least in part, on the prior impression effect parameters. One or more current impression effect parameters may be received and a decay factor of an impression effect may be determined for a content item using the impression effect decay predictive model and the received one or more current impression effect parameters. The operations may further include determining a value for the content item based, at least in part, on the decay factor and a bid associated with the content item. The content item may be selected based, at least in part on the determined value and data to effect presentation of the selected content item may be provided.

Yet a further implementation relates to a computer readable storage device storing instructions that, when executed by one or more processing modules, cause the one or more processing modules to perform several operations. The operations may include receiving one or more impression effect parameters and a predictive model. The operations may further include determining a predicted value for a content item using the predictive model and the received one or more impression effect parameters. A value for the content item may be determined based, at least in part, on the predicted value and a bid associated with the content item. The operations may further include selecting the content item based, at least in part, on the determined value and providing data to effect presentation of the selected content item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
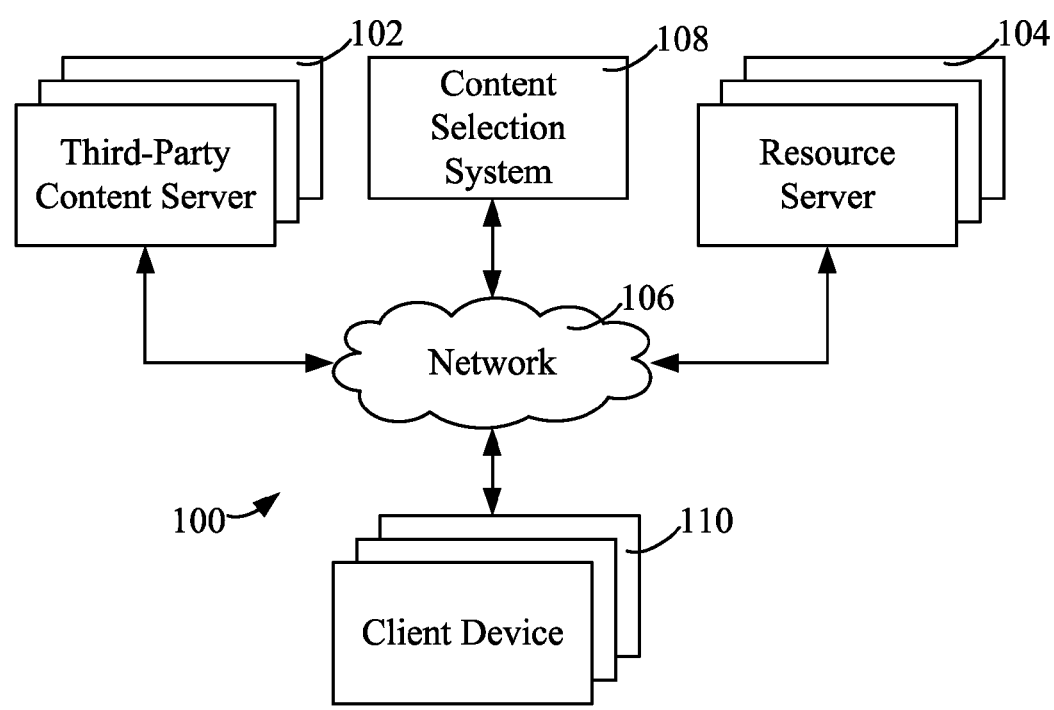
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL (e.g., /page/contentitem?devid=abc123&devnfo=A34r0). The content item request URL may include one or more parameters. Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, and/or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In the foregoing example, the content item selection system may select the content item associated with the bid based on whether the user performs the specific action.

Once a third-party content item is selected by the content item selection system, data to effect presentation of the third-party content item on a display of the client device may be provided to the client device using a network.

After a content item, such as an advertisement, is served to be presented with a resource to a user, the content item may have an effect on the user viewing the content item—an impression effect. As time elapses, the effect of the impression fades as the user may forget about the content item. In some implementations, the impression effect may be logged as a count of the times a content item is selected and served to a user within a given period, such as daily. Once the count exceeds a predetermined level, such as a frequency cap, the content item may be excluded from future selection by the content item selection system.

In other implementations, the impression effect and decay thereof may be used to reduce the likelihood that the content item is selected and served by the content item selection system soon after an initial impression. As time elapses and the decay of the impression effect continues, it may be more useful to show the same content item to the same user. Accordingly, the likelihood of the content item being selected and served by the content item selection system may increase based on the decaying impression effect in some implementations.

Thus, it may be useful to determine and/or model an impression effect of a content item and the decay of the impression effect. Such modeling of the impression effect and the decay may be used by the content item selection system during the determination of whether to select a content item. In some implementations, the modeling of the impression effect may be over an extended period of time, such as the distribution of an impression effect over one week, two weeks, four weeks, etc. In some implementations, the modeling may be effected through the use of a predictive model that outputs one or more values in response to receiving one or more impression effect input parameters. In an implementation, the predictive model may output several values such that a graph, data table, or other data aggregation object may be generated for the predicted impression effect. In another implementation, the predictive model may output several values such that a graph, data table, or other data aggregation object may be generated for the predicted decay of the impression effect.

The decay of the impression effect may be dependent on the user, the content item, the third-party content provider, a resource with which the content item is presented, etc. For example, each content item may have a different effect on retaining user interest, a different user demand cycle time, etc. Thus, the decay of the impression effect may vary for different content items. Similarly, different aggregate user profiles may be associated with different interests, different behavior patterns, etc., and may react to repetitive impressions distinctively. Accordingly, one or more of the inputs for the predictive models described herein may include parameters associated with an aggregate profile, parameters associated with a client device, parameters associated with a publisher or resource, parameters associated with a content item or campaign, and/or parameters associated with a third-party content provider.

In other implementations, the predictive model may output a value corresponding to the current predicted impression effect and/or decay value. The predicted impression effect and/or decay value, for example a decay factor, may then be used in determining the value, such as a score, by the content item selection system. That is, a predicted impression effect and/or decay value for a given client device, a given content item, and a given resource and/or publisher may be used during the selection of a content item in response to a content item request. For example, an outputted decay factor from the predictive model may be used as a discount factor when determining the value. In still other implementations, the impression effect decay predictive model may be incorporated as part of a predictive model for other predicted values, such as a pCTR predictive model or a pCVR predictive model, such that the predictive model may take into account the impression effect decay in calculating the value, such as pCTR or pCVR.

The foregoing impression effect and decay thereof may be used to improve a user's engagement or experience with content items by improving the effective delivery of relevant content items without oversaturating a user with relevant content items or unduly restricting a relevant content item from being selected and served to the user. Rather, the impression effect and decay thereof described herein attempts to deliver a relevant content item at the right time based on several impression effect parameters through the use of a predictive model. That is, an impression effect decay predictive model may learn the distribution of time after an initial impression that it takes for a user to engage with a content item.

While the foregoing has provided an overview of modeling impression effect, the decay of the impression effect, and implementations utilizing such modeling, more specific examples and systems to implement such a system will now be described.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a data processor, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, ActionScript®, JavaScript®, JSON, Perl®, HTML, HTML5, XML, Python®, and Visual Basic®. The processing module may process instructions and provide data to effect presentation of one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, ActionScript®, JavaScript®, JSON, Perl®, HTML, HTML5, XML, Python®, and Visual Basic®.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide webpage data and/or other data to the client device 110, which causes visual indicia to be displayed by the display of the client device 110. Accordingly, the browser window displays the retrieved first-party content, such as webpages from various websites, to facilitate user interaction with the first-party content.

The resource server 104 can include a computing device, such as a server, configured to host a resource, such as a webpage or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a webpage. The client device 110 may be a computing device operated by a user (represented by a device identifier), which, when accessing a resource of the resource server 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). The information or parameters that the content item selection system 108 receives can include a HyperText Transfer Protocol (HTTP) cookie which contains a device identifier (e.g., a random number) that represents the client device 110. In some implementations, the device and/or the resource information or parameters may be appended to a content item request URL (e.g., /page/contentitem?devid=abc123&devnfo=A34r0). In some implementations, the device and/or the resource information or parameters may be encoded prior to being appended the content item request URL. The requesting device and/or the resource information or parameters may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as webpages, etc.) for relevant search results based on the search query. The search results may be transmitted as a second resource to present the relevant search results, such as a search result webpage, on a display of a client device 110. The search results may include webpage titles, hyperlinks, etc. One or more third-party content items may also be presented with the search results in a content item slot of the search result webpage. Accordingly, the resource server 104 and/or the client device 110 may request one or more content items from the content item selection system 108 to be presented in the content item slot of the search result webpage. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for client devices 110 having device identifiers associated with a certain geographic location or region, a certain language, a certain operating system, a certain web browser, etc. In another implementation, the third-party content provider may specify that a content item or set of content items should be selected and served when the resource, such as a webpage, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 2:
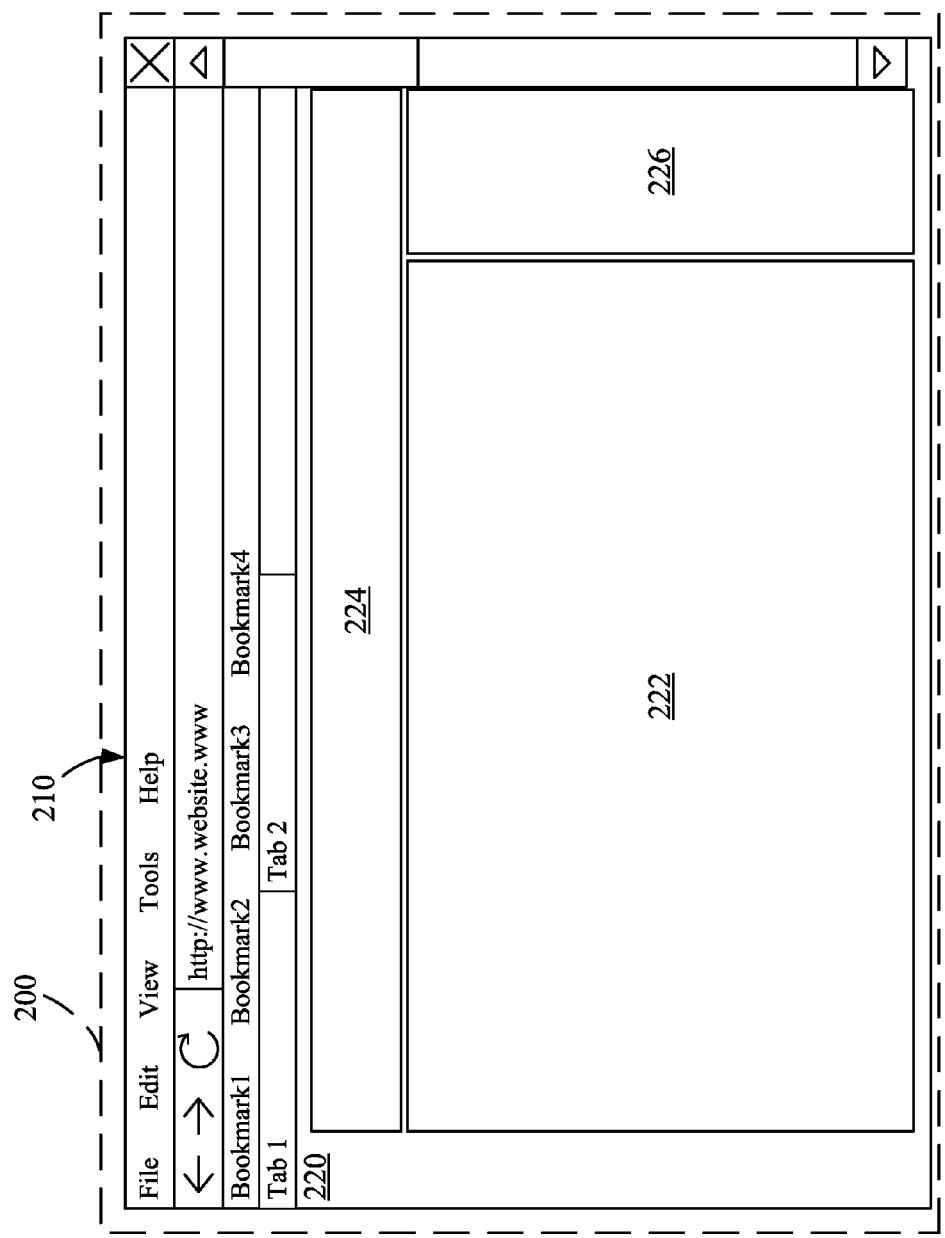
FIG. 2 is an illustration of an implementation of a first-party resource having third-party content.

While the foregoing has provided an overview of a system 100 for selecting and serving content items to client devices 110, examples of content items served with resources will now be described in reference to FIGS. 2-3. FIG. 2 depicts an example display 200 (shown in phantom) of a client device, such as client device 110 of FIG. 1, with a web browser 210 for displaying resources on the display 200.

The web browser 210 may operate by receiving input of a URL in an address bar, such as a web address, from an input device (e.g., a pointing device, a keyboard, a touch screen, or another form of input device). In response, one or more processors of a client device executing the instructions from the web browser 210 may request data from another device connected to a network, such as network 106, referred to by the URL address (e.g., a resource server 104). The other device may then provide data to effect presentation of the resource to the client device, which causes visual indicia to be displayed by the display 200 of the client device. Accordingly, the web browser 210 displays a retrieved resource 220, such as a webpage.

An example resource 220 is shown displayed by the display 200 of the client device using the web browser 210. The resource 220 includes a first-party content portion 222, a first content item slot 224, and a second content item slot 226. The first-party content portion 222 includes the first-party content of the first-party content provider, such as a news article, a social network interface, an application, etc. In the example shown in FIG. 2, a first third-party content item may be selected and served in the first content item slot 224 and a second third-party content item may be selected and served in the second content item slot 226, such as using content item selection system 108 of FIG. 1.

In some implementations, the first-party content of the resource 220 may impact the impression effect decay for a content item presented with the resource 220. For example, if the first-party content of the resource 220 is an application, such as a web game, then the presentation of a third-party content item in the first content item slot 224 and/or the second content item slot 226 may result in less of an impression effect and/or a more rapid impression effect decay. In another example, if the first-party content of the resource 220 is news article, then the presentation of a third-party content item in the first content item slot 224 and/or the second content item slot 226 may result in a greater impression effect and/or a slower impression effect decay. Such first-party content characterizations may be categorized (e.g., news-related resource content, application-related resource content, etc.) and represented by a corresponding value for a parameter (e.g., a value of 1 for the parameter ResConType corresponds to a news-related resource content, 2 for application-related resource content, etc.).

According to various implementations, data for the content of the resource 220 may be sent to the content item selection system 108 of FIG. 1. The content of the resource 220 may be parsed for keyword terms to determine the category of the content of the resource 220. For example, the content item selection system 108 may receive or extract keyword terms and determine a category for the resource 220 based on the keyword terms. In general, a category may be a set of words that convey the same or similar ideas. A word category may be a set of synonyms, according to one implementation. For example, the text of the resource 220 may include the word "hotel." A word category that includes the word "hotel" may be as follows: category_1={inn, hotel, hostel, lodge, motel, public house, spa}

Such a category may be used to identify resources 220 devoted to the same topic, but use different terminology to do so.

In various implementations, the category of the content of the resource 220 may be determined based on the parsed keyword terms. For example, a resource 220 containing keyword terms for news may indicate a news article. In other implementations, the category of the content of the resource 220 may be determined based on a structure of the resource 220. For example, the resource 220 having a first-party content portion 222 having a long vertical textual portion may correspond to an article category for the content of the resource 220. In other instances, a first-party content portion 222 having several images may indicate and photo album category for the content of the resource 220. In still other instances, a first-party content portion 222 having a Flash® module may correspond to an application category for the content of the resource 220.

In another example, the publisher of content of the resource 220 may impact the impression effect decay for a content item presented with the resource 220. For example, if the publisher of the first-party content displayed in the first-party content portion 222 is a first entity, such as a well-known news publisher having readers that are more likely to be engaged with a third-party content item served with the first-party content, then the presentation of a third-party content item in the first content item slot 224 and/or the second content item slot 226 may result in a greater impression effect and/or a slower impression effect decay. In another example, if the publisher of the first-party content displayed in the first-party content portion 222 is a second entity, such as a social link aggregation publisher having readers that are less likely to be engaged with a third-party content item served with the first-party content, then the presentation of a third-party content item in the first content item slot 224 and/or the second content item slot 226 may result in less of an impression effect and/or a more rapid impression effect decay. Of course other parameters associated with the resource 220 and/or the publisher of the resource 220 may be used.

Figure 3:
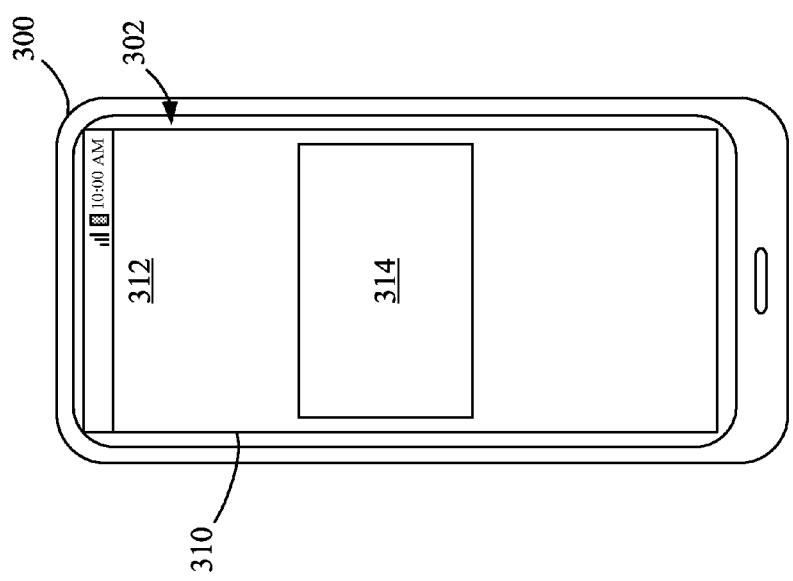
FIG. 3 is an illustration of an implementation of another first-party resource displayed on a mobile device and having third-party content.

FIG. 3 depicts a mobile client device 300, such as a smartphone or tablet, on which a resource 310 may be displayed by a display 302 of the client device 300. In the example depicted in FIG. 3, the resource 310 is a mobile application executing on the client device 300. In some implementations, the mobile application resource 310 may execute code to effect presentation of first-party content 312 (e.g., a mobile game application), on the display 302 of the client device 300. In some implementations, the resource 310 may also include code to request one or more third-party content items 314 to be presented with the first-party content 312. In response, one or more processors of the client device 300 executing the instructions may request data from another device (e.g., a content item selection system 108) connected to a network, such as network 106. The other device may then provide data to effect presentation of the third-party content item 314 to the client device 300, which causes visual indicia to be displayed by the display 302 of the client device 300.

In some implementations, the first-party content 312 may impact the impression effect decay for a content item 314 presented with the first-party content 312. In the example shown in FIG. 3, if the resource 310 includes first-party content 312 for a mobile game application, then the presentation of the third-party content item 314 may result in less of an impression effect and/or a more rapid impression effect decay. In another example, if the resource 310 includes first-party content 312 for a news application, then the presentation of the third-party content item 314 may result in a greater impression effect and/or a slower impression effect decay.

In another example, the publisher of the resource 310 may impact the impression effect decay for a content item 314 presented with the first-party content 310. For example, if the publisher of the resource 310 is a first entity, such as a mobile game application producer having application users that are more likely to be engaged with a third-party content item 314 served with the first-party content 312, then the presentation of a third-party content item 314 may result in a greater impression effect and/or a slower impression effect decay. In another example, if the publisher of the resource 310 is a second entity, such as a news aggregation application publisher having readers that are less likely to be engaged with a third-party content item 314 served with the first-party content 312, then the presentation of a third-party content item 314 may result in less of an impression effect and/or a more rapid impression effect decay. Of course other parameters associated with the resource 310 and/or the publisher of the resource 310 may be used.

Figure 4:
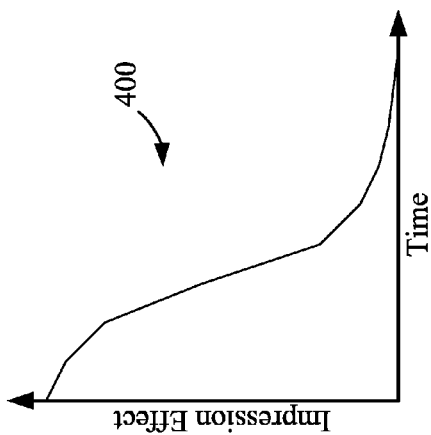
FIG. 4 is a graphical diagram depicting an impression effect decaying over a time period.
Figure 5:
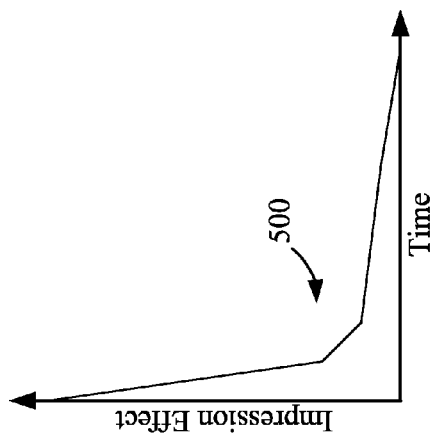
FIG. 5 is a graphical diagram depicting another impression effect decaying over a time period.

FIGS. 4-5 depict graphical diagrams depicting impression effects 400, 500 decaying over a time period. In the example shown in FIG. 4, the impression effect 400 lasts for a first period of time before slowly decaying, then rapidly decays over a second period of time, followed by a slower decay until the impression effect 400 is substantially zero. Such an impression effect 400 curve may, for example, correspond to the impression effect of a first content item presented to a client device having a first aggregate profile and with a news article resource 220 of FIG. 2 or a news aggregation application resource 310 of FIG. 3. In the example shown in FIG. 5, the impression effect 500 rapidly decays over a first period of time followed by a slower decay until the impression effect 500 is substantially zero. Such an impression effect 500 curve may, for example, correspond to the impression effect of the same first content item presented to the same client device having the same first aggregate profile and with a web game application resource 220 of FIG. 2 or a mobile game application resource 310 of FIG. 3. Other impression effect curves may be determined or generated based on other parameters described herein.

Figure 6:
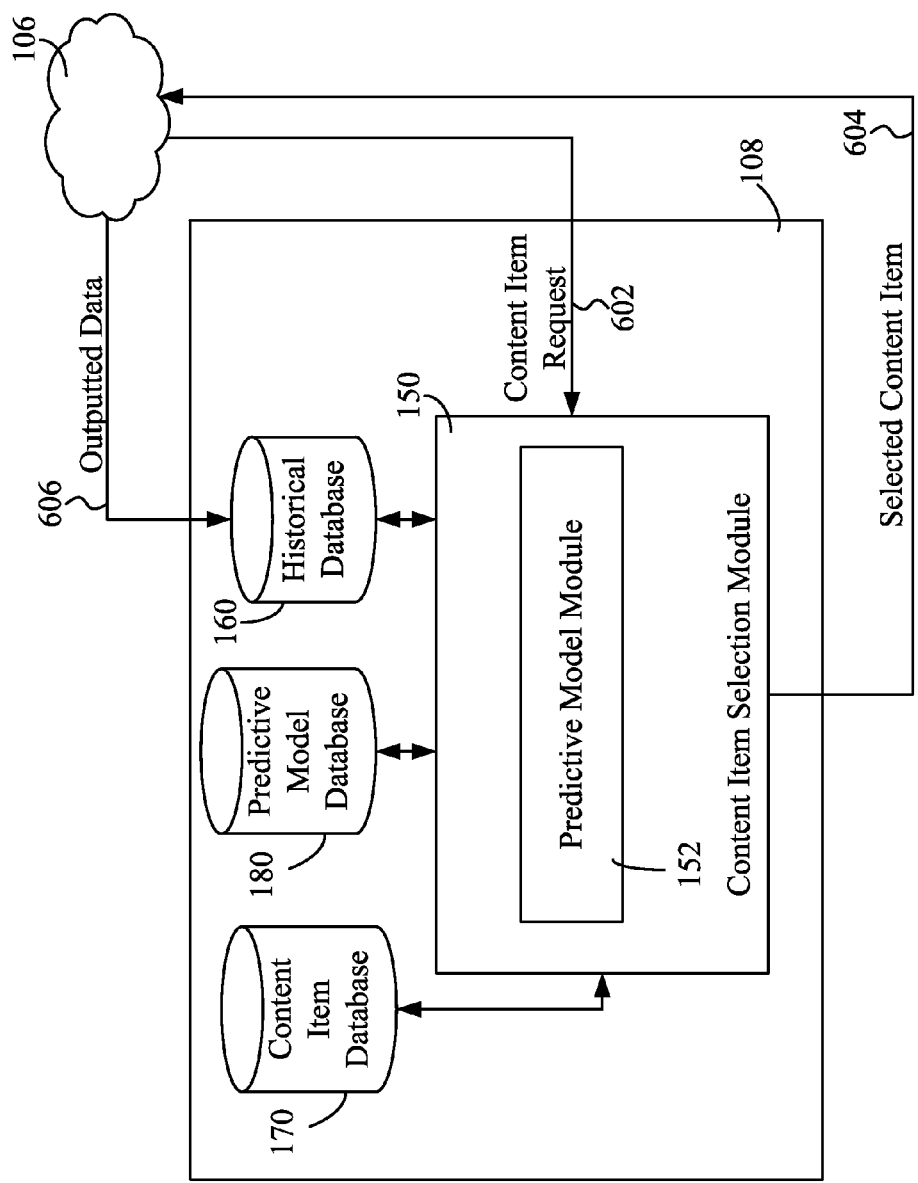
FIG. 6 is a block diagram of an implementation of a system for selecting content items using a predictive model.

The impression effect and decay thereof may be useful in determining whether to select and serve a previously served content item or another content item. For example, if a relevant content item has been recently shown to a user of a client device and a slightly less relevant content item has not been recently shown, then it may be useful to use such data by the content item selection system 108 of FIG. 1 to select and serve the less relevant content item instead of reserving the recently served content item. FIG. 6 is a block diagram of an example portion of the content item selection system 108 of FIG. 1 that utilizes the impression effect and decay in the selection and serving of content items. The content item selection system 108 includes a content item selection module 150 and one or more databases, such as a historical database 160, a content item database 170, and/or a predictive model database 180.

The content item selection module 150 is configured to receive a content item request 602 via the network 106. A client device, such as client device 110 of FIG. 1, or a resource server, such as resource server 104, may send the content item request 602 to the content item selection system 108 via the network 106. The content item request 602 may include one or more current impression effect parameters representative of characteristics of the client device (e.g., a unique identifier associated with the client device, a type of client device, a display type of a client device, dimensions of the display, etc.), a current client device context, a client device intention (e.g., an interest in purchasing a product, an intention to view more information on a topic, etc.), an aggregate profile (e.g., an aggregate profile of several client devices associated with the current client device), and/or characteristics of a resource with which the content item is to be presented (e.g., a URL of the resource, one or more keywords of the content of the resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). In some implementations, the foregoing current impression effect parameters may be appended to or included in a content item request URL (e.g., /page/contentitem?devid=abc123&devnfo=A34r0).

Responsive to the content item request 602, the content item selection module 150 is configured to select and serve a content item 604. In some implementations, the content item selection module 150 is configured to perform an auction. That is, the content item selection module 150 may generate one or more values for one or more content items based, at least in part, on the content item request 602, and select one or more content items to be served. In some instances, the content item selection module 150 ranks the values (e.g., highest to lowest) and selects the content item associated with a value based on the ranking (e.g., selecting the content item associated with the highest ranked value). As will be described in greater detail herein, a predictive model, such as an impression effect decay predictive model, may be used by a predictive model module 152 of the content item selection module 150 that modifies the value generated by the content item selection module 150.

Data to effect presentation of the selected content item 604 may be transmitted or served by the content item selection module 150 to the client device and/or the resource server via the network 106. The data can include graphical data, textual data, image data, audio data, video data, etc. that may be accessed from a database, such as the content item database 170 described herein.

The databases 160, 170, 180 shown in FIG. 6 may store data for and/or provide data to the content item selection module 150. The databases 160, 170, 180 may include a static storage device, such as ROM, solid state drive (SSD), flash memory (e.g., EEPROM, EPROM, etc.), magnetic disc, optical disc, etc., a plurality of static storage devices, a cloud storage system, a server, and/or any other electronic device capable of storing and providing data. While the implementation shown in FIG. 6 depicts the databases 160, 170, 180 as separate databases, it should be understood that the databases 160, 170, 180 may be combined into a single database or sets of databases.

The data stored in the historical database 160 may include data for one or more prior impression effect parameters. The prior impression effect parameters may be associated with a client device, a content item, a third-party content provider, a resource, and/or a publisher. In some implementations, the prior impression effect parameters may be associated with a historical engagement of one or more client devices with one or more content items. That is, the historical database 160 may store in a data structure, such as a data table, one or more prior impression effect parameters about the context of a prior selection, serving, and/or interaction of one or more client devices with one or more content items.

Such prior impression effect parameters may include whether a client device performed a conversion action, such as clicking on one or more content items, purchasing a product associated with the one or more content items, registering for a service associated with the one or more content items, signing up for an e-mail list associated with the one or more content items, etc.

In addition, the prior impression effect parameters may include prior device information (e.g., one or more other previous resource requests from the client device, one or more previous other content items received by the client device, previous contextual data for the client device, previous intention data for the client device, one or more previous interests for the client device, an aggregate profile, etc.) and prior resource information (e.g., prior URLs of requested resources, one or more keywords of the content of the prior requested resources, text of the content of the prior resources, a title of the prior resources, a category of the prior resources, a type of the prior resources, a property of the prior resources, an interactivity level of the prior resources, a ranking of the prior resources, a popularity of the prior resources, a category of a publisher associated with the prior resources, a type of a publisher associated with the prior resources, a property of a publisher associated with the prior resources, etc.).

The prior impression effect parameters may also include prior content item parameters, such as a property of the prior content item, an interactivity of the prior content item, a popularity of the priority content item, a category of the prior content item, one or more keywords associated with the prior content item, a format of the prior content item, a group associated with the prior content item, a campaign associated with the prior content item, etc.

The prior impression effect parameters may still further include temporal parameters associated with the one or more client devices and the one or more content items, such as a prior time of a day associated with when the one or more client devices were served the one or more content items (e.g., an exact time of the day, an hour of the day, a categorical period, such as morning, of the day, etc.), a prior day of a week associated with when the one or more client devices were served the one or more content items (e.g., a Monday, a Tuesday, etc.), a prior day of a month associated with when the one or more client devices were served the one or more content items, a prior day of a year associated with when the one or more client devices were served the one or more content items, a time differential between when the one or more client devices were served a content item and a conversion action performed by the client device associated with the content item (e.g., five days between when a content item is served and a conversion action), a number of impressions of one or more content items before a conversion action performed by the client device associated with the content item (e.g., a content item was shown three times before a conversion action), a number of impressions of one or more content items associated with a client device within a prior predetermined period of time (e.g., a number of impressions of a content item for the past 30 days, 60 days, 90 days, etc.), etc.

In some implementation, the prior impression effect parameters received with the content item request 602 may be stored in the historical database 160. If a conversion action is performed in response to the selected and served content item 604, the client device may provide data 606 indicative of such a conversion action. In some instances, the provided data 606 may include a unique identifier such that the data indicative of the conversion action may be associated with the stored parameters received with the content item request 602. Thus, the parameters of the content item request 602 may be used as prior impression effect parameters to generate and/or update an impression effect decay predictive model.

The data stored in the content item database 170 may include data to effect presentation of one or more content items. The data can include graphical data, textual data, image data, audio data, video data, etc. The data stored in the content item database 170 may include unique identifiers associated with the data such that the content item selection module 150 can access the corresponding data based on the unique identifier.

In some implementations, the predictive model database 180 may store data for one or more generated impression effect decay predictive models. For example, in some implementations an impression effect decay predictive model may be generated for each content item and stored in the predictive model database 180. In other implementations, an impression effect decay predictive model may be generated for each client device and stored in the predictive model database 180. In further implementations, an impression effect decay predictive model may be generated for third-party content provider and/or for each campaign of the third-party content provider and stored in the predictive model database 180. In yet other implementations, other predictive models may incorporate a impression effect decay predictive model, such as a predictive model for pCTR that incorporates the impression effect decay, a predictive model for pCVR that incorporates the impression effect decay, etc. The predictive models described herein may each be associated with a unique identifier such that the content item selection module 150 can access the corresponding predictive model based on the unique identifier.

The content item selection module 150 includes a predictive model module 152. In some implementations, the predictive model module 152 is configured to access data stored in the historical database, such as the one or more prior impression effect parameters discussed herein, and to generate and/or update one or more predictive models described herein. As noted above, the generated and/or updated predictive models may be stored in the predictive model database 180. In some implementations, the predictive model module 152 may generate and/or update the predictive model using a machine learning algorithm, such as a regression learning algorithm. Examples of such regression learning algorithms include perceptron linear learning, maximum entropy logistic regression, support vector machine (SVM) regression with maximum entropy gradient, descent least-squares stochastic gradient, etc.

The predictive model module 152 is also configured to access the one or more current impression effect parameters from a data structure, such as the content item request 602. In some implementations, the content item selection module 150 receives the content item request 602 and may parse one or more current impression effect parameters included with the content item request 602. If the one or more current impression effect parameters are encoded for the content item request 602, the content item selection module 150 may decode the encoded current impression effect parameters. The predictive model module 152 accesses the parsed one or more current impression effect parameters.

The predictive model module 152 may also access one or more current impression effect parameters associated with a content item and/or third-party content provider. For example, each content item that is to be included in an auction performed by the content item selection module 150 may have one or more parameters that may affect the impression effect and/or the decay thereof. For example, such parameters may include a category of the content item, one or more keywords associated with the content item, a format of the content item, a group of the content item, a campaign of the content item, an interactivity level of the content item, a popularity of the content item, a category of a third-party content provider associated with the content item, a type of a third-party content provider associated with the content item, a property of a third-party content provider associated with the content item, etc.

In some implementations, the predictive model module 152 may also access a predictive model from the predictive model database 180 with which to use the accessed one or more current impression effect parameters. In some implementations, a single predictive model may be accessed to be used with the one or more parameters to generate a value for each content item to be in the auction performed by the content item selection module 150. That is, the predictive model module 152 may use the single predictive model with the received one or more parameters of the content item request 602 and one or more parameters of each content item in the auction to output a corresponding value for each content item.

In some implementations, a predictive model may be accessed from the predictive model database 180 corresponding to a content item, a third-party content provider, a campaign, a resource, a publisher, or a client device (for example, a predictive model may be associated with a client device such that the same predictive model may be used for each content item request 602 from that client device).

The predictive model module 152 outputs a value using a predictive model, such as the impression effect decay predictive models described herein, and based on the one or more parameter inputs. In some implementations, the outputted value may be a decay factor. The decay factor may have a numerical value between 0, inclusive, and 1, inclusive, such as 0.647, that may be used to modify a value generated by the content item selection module 150. In some instances, the decay factor may be a discount factor that may be multiplied by the value generated by the content item selection module 150. For example, a decay factor of 0, which may correspond to when a content item is initially shown, may result in the value generated by the content item selection module 150 to also be 0. Thus, a content item that has just been selected and served to a client device is unlikely to be shown based on the substantial reduction of the value by the decay factor. In another example, a decay factor of 0.7, which may correspond to a content item being shown a few days ago, may result in the value generated by the content item selection module 150 to be reduced, but may still be likely to be selected. A decay factor of 1, which may correspond to a content item being shown a few weeks ago, may not modify the value generated by the content item selection module 150. That is, the decay factor indicates the content item has been shown a substantially long time ago and will not lessen the likelihood of the content item being selected and served to the client device. In some implementations the value generated by the content item selection module 150 may be divided by an inverse of the decay factor to increase the value generated by the content item selection module 150, thereby promoting content items that have not been shown for a long period of time. In still other implementations, the value output by the predictive model may be added or subtracted from the value generated by the content item selection module 150.

In some other implementations, the outputted value may be another predicted value, such as a value for pCTR or pCVR representative of a probability that the content item will be clicked on or that a conversion will occur, respectively. As described in greater detail herein, the predictive model may integrate an impression effect decay predictive model into the predictive model for the predicted value (e.g., integrated into a pCTR predictive model or a pCVR predictive model).

Figure 7:
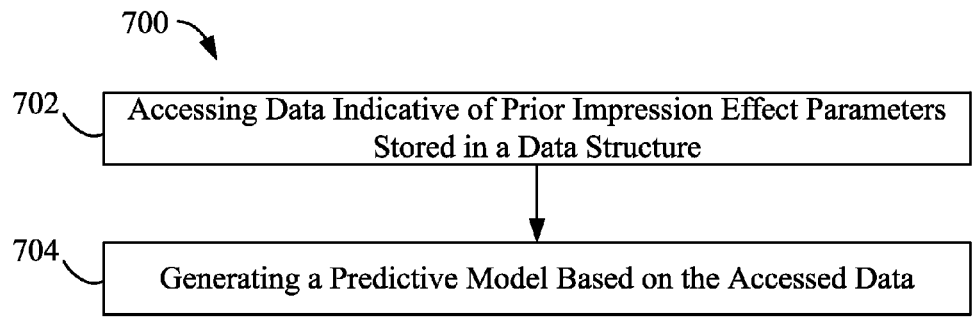
FIG. 7 is a flow diagram of an implementation of a process for training a predictive model.

FIGS. 7-10 depict processes 700, 800, 900, 1000 that may be implemented by the content item selection system 108 to select and serve content items utilizing predictive models that factor in the impression effect and decay thereof. FIG. 7 depicts an implementation of a process 700 that may be used by the predictive model module 152 for generating an impression effect decay predictive model based on prior impression effect parameters. The process 700 includes accessing data indicative of prior impression effect parameters stored in a data structure (block 702). The prior impression effect parameters may be accessed by the predictive model module 152 of the content item selection system 108 from a data structure, such as a data table, stored in a database, such as the historical database 160. The prior impression effect parameters include known input parameters that are associated with known output values. Examples of such known output values may include whether a content item was clicked on, whether a conversion action occurred, etc. Such prior impression effect input parameters may include, for example, a number of impressions for one or more content items associated with the known output value within a prior predetermined period of time, one or more temporal parameters associated the one or more content items associated with the known output value, one or more content item parameters associated with the one or more content items associated with the known output value, one or more prior third-party content provider parameters associated with the one or more content items associated with the known output value, one or more prior device parameters associated with the one or more content items associated with the known output value, one or more prior resource parameters associated with the one or more content items associated with the known output value, etc.

A predictive model is generated based on the accessed prior impression effect parameters and the known output values (block 704). The predictive model module 152 may generate the impression effect decay predictive model using a machine learning algorithm, such as a regression learning algorithm. Examples of such regression learning algorithms include perceptron linear learning, maximum entropy logistic regression, support vector machine (SVM) regression with maximum entropy gradient, descent least-squares stochastic gradient, etc. In some implementations, an impression effect decay predictive model may be generated for each content item, third-party content provider, campaign, resource, publisher, and/or client device.

The predictive model generated by the predictive model module 152 may be configured to model the impression effect decay over a predetermined period of time. In some implementations, the predictive model module 152 may be configured to generate predictive models for impression effect decay of a period of time that is greater than one day. For example the period of time may be one week, two weeks, three weeks, four weeks, two months, three months, six months, one year, etc. In some implementations, the period of time may be used to limit the prior impression effect parameters used by the predictive model module 152 in generating the predictive model. That is, the period of time for which the predictive model is to be configured for may be used as a date span for the impression effect parameters. For example, if the predictive model is to be configured to model the impression effect over a period of four weeks, then only the impression effect parameters associated with a known output value for a content item that occurred within four weeks of the initial impression of the content item are used by the predictive model module 152 in generating the predictive model. Impression effect parameters associated with a known output value for a content item that occurred more than four weeks from the initial impression of the content item may be omitted. In other implementations, all impression effect parameters associated with a known output value for a content item may be used to generate the predictive model.

In some implementations, the generated predictive model or models may be stored in a database, such as the predictive model database 180, such that the predictive model or models may be used by the predictive model module 152 in response to another content item request. In some implementations, each predictive model may include a unique identifier. In some implementations, the process 700 may receive additional prior impression effect input parameters (block 702) and may update the predictive model or regenerate the predictive model (block 704) based on the additional prior impression effect input parameters and known additional output values.

Figure 8:
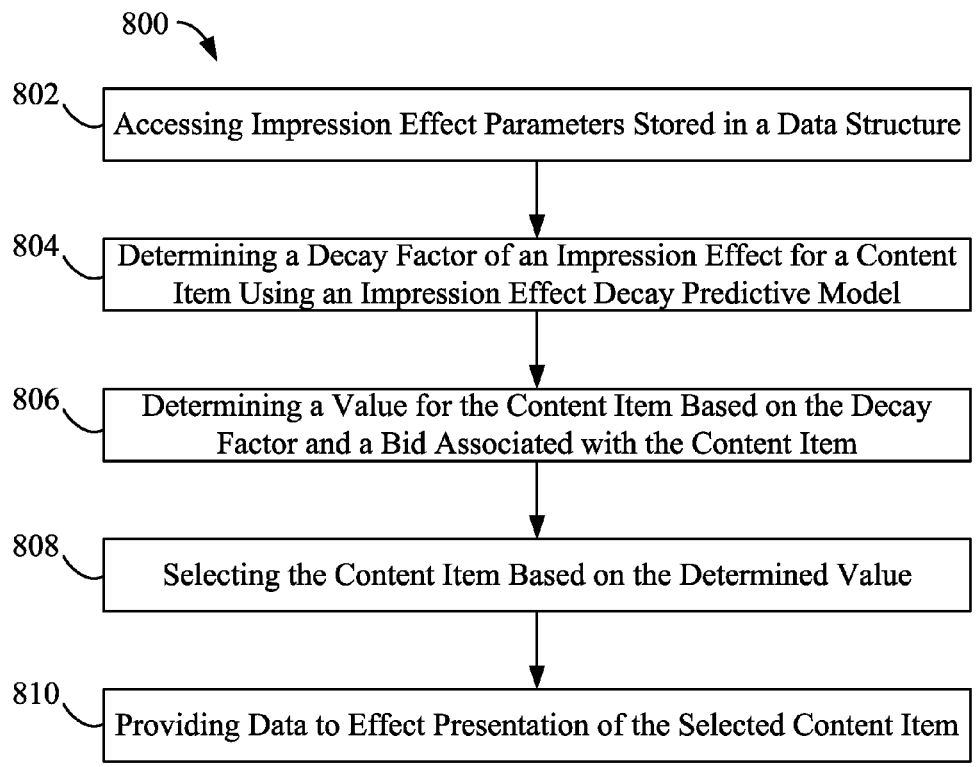
FIG. 8 is a flow diagram of an implementation of a process for using a predictive model to select a content item.

FIG. 8 depicts an implementation of a process 800 for selecting and serving a content item using an impression effect decay predictive model. The process 800 includes accessing impression effect parameters stored in a data structure (block 802). The impression effect parameters may include current impression effect parameters as well as prior impression effect parameters. The current impression effect parameters may be accessed by the predictive model module 152 from a data structure, such as a memory, once the current impression effect parameters are parsed from a content item request, such as content item request 602. The current impression effect parameters from the content item request 602 may include characteristics of the client device (e.g., a unique identifier associated with the client device, a type of client device, a display type of a client device, dimensions of the display), a current client device context, a client device intention, an aggregate profile (e.g., an aggregate profile of several client devices associated with the current client device), and/or characteristics of a resource with which the content item is to be presented (e.g., a URL of the resource, one or more keywords of the content of the resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.).

The current impression effect parameters may also be accessed from a data structure associated with a content item for which a value is to be outputted from the predictive model. For example, each third-party content item may be associated with a data structure including content item parameters and the third-party content provider parameters. Such parameters may include a category of the content item, one or more keywords associated with the content item, a format of the content item, a group of the content item, a campaign of the content item, an interactivity level of the content item, a popularity of the content item, a category of a third-party content provider associated with the content item, a type of a third-party content provider associated with the content item, a property of a third-party content provider associated with the content item, etc.

In some implementations, the prior impression effect parameters may be accessed by the predictive model module 152 of the content item selection system 108 from a data structure, such as a data table, stored in a database, such as the historical database 160. The prior impression effect parameters include those parameters associated with the client device which is to be served a content item in response to a content item request. That is the prior impression effect parameters may be associated with a historical engagement of the client device with one or more content items.

The prior impression effect parameters may include parameters associated with prior content items, prior third-party content providers, prior resources, and/or prior publishers. Such prior impression effect parameters may include whether a client device performed a conversion action, prior device parameters (e.g., one or more other previous resource requests from the client device, one or more previous other content items received by the client device, previous contextual data for the client device, previous intention data for the client device, one or more previous interests for the client device, an aggregate profile, etc.), prior resource parameters (e.g., prior URLs of requested resources, one or more keywords of the content of the prior requested resources, text of the content of the prior resources, a title of the prior resources, a category of the prior resources, a type of the prior resources, a property of the prior resources, an interactivity level of the prior resources, a ranking of the prior resources, a popularity of the prior resources, a category of a publisher associated with the prior resources, a type of a publisher associated with the prior resources, a property of a publisher associated with the prior resources, etc.), prior content item parameters (e.g., a property of the prior content item, an interactivity of the prior content item, a popularity of the priority content item, a category of the prior content item, one or more keywords associated with the prior content item, a format of the prior content item, a group associated with the prior content item, a campaign associated with the prior content item, etc.), and/or temporal parameters associated with the client device (e.g., a prior time of a day associated with when the client device was served one or more content items, a prior day of a week associated with when the client device was served one or more content items, a prior day of a month associated with when the client device was served one or more content items, a prior day of a year associated with when the client device was served one or more content items, a time differential between when the client device was served a content item and a conversion action performed by the client device, a number of impressions of one or more content items before a conversion action was performed by the client device, a number of impressions of one or more content items for the client device within a prior predetermined period of time, etc.).

Using the impression effect parameters and an impression effect decay predictive model, the predictive model module 152 determines a decay factor for a content item (step 804). In some implementations, the predictive model module 152 accesses an impression effect decay predictive model from the predictive model database 180 with which to use the accessed impression effect parameters. In some implementations, a single impression effect decay predictive model may be accessed to be used with the parameters to generate a decay factor for each content item in an auction performed by the content item selection module 150. That is, the predictive model module 152 may use the single impression effect decay predictive model with the accessed parameters of the content item request 602 and the parameters of each content item in the auction to output a corresponding decay factor value for each content item. In other implementations, an impression effect decay predictive model may be accessed from the predictive model database 180 corresponding to a content item, a third-party content provider, a campaign, a resource, a publisher, or a client device. In the example of process 800 of FIG. 8, the decay factor is a numerical value indicative of a predicted decay of a previous impression of the content item based on the impression effect parameters. In some implementations, the decay value may be a numerical value between 0, inclusive, and 1, inclusive.

A value is determined for the content item based, at least in part, on the decay factor and a bid associated with the content item (block 806). In an example, the content item selection module 150 determines the value using the decay factor output from the predictive model module 152, a bid associated with the content item for which the decay factor was generated, and another predicted value, such as a pCTR value or pCVR value. That is, the content item selection module 150 may generate a score for the content item to be used in the auction based on the decay factor, the bid value, and the predicted value or another modifying value. In some instances, the decay factor may be a discount factor to reduce a score determined based on the bid and the predicted value by the content item selection module 150. Such a score may be calculated by $$\text{Score} = D_f * B * P$$

where $D_f$ is the decay factor, B is the bid value, and P is the predicted value, such as pCTR or pCVR. In other implementations, the decay factor may be divided, subtracted, or added to a score determined based on the bid and the predicted value by the content item selection module 150.

The content item is selected based on the determined value (block 808). The content item may be selected by the content item selection module 150 based on an auction where scores are determined for each content item in the auction. The content item selection module 150 may select the content item associated with the highest determined score after the decay factor is factored in. In some implementations, each score is associated with a unique identifier for the associated content item. Based on the determined values or score, the content item selection module 150 may use the unique identifier associated with the highest determined value or score, in one implementation, to identify the selected content item associated with the highest determined value or score.

Data to effect presentation of the selected content item (block 810) is provided by the content item selection system 108 to a client device and/or a resource server via the network 106. In some implementations, the content item selection module 150 may access the data to effect presentation of the selected content item from the content item database 170. The data to effect presentation of the selected content item may be accessed from the content item database 170 using the unique identifier associated with the selected content item. The data to effect presentation of the selected content item can include graphical data, textual data, image data, audio data, video data, etc. The client device receives the data to effect presentation of the selected content item and may display the selected content item on a display of the client device, such as those shown and described in reference to FIGS. 2-3.

Figure 9:
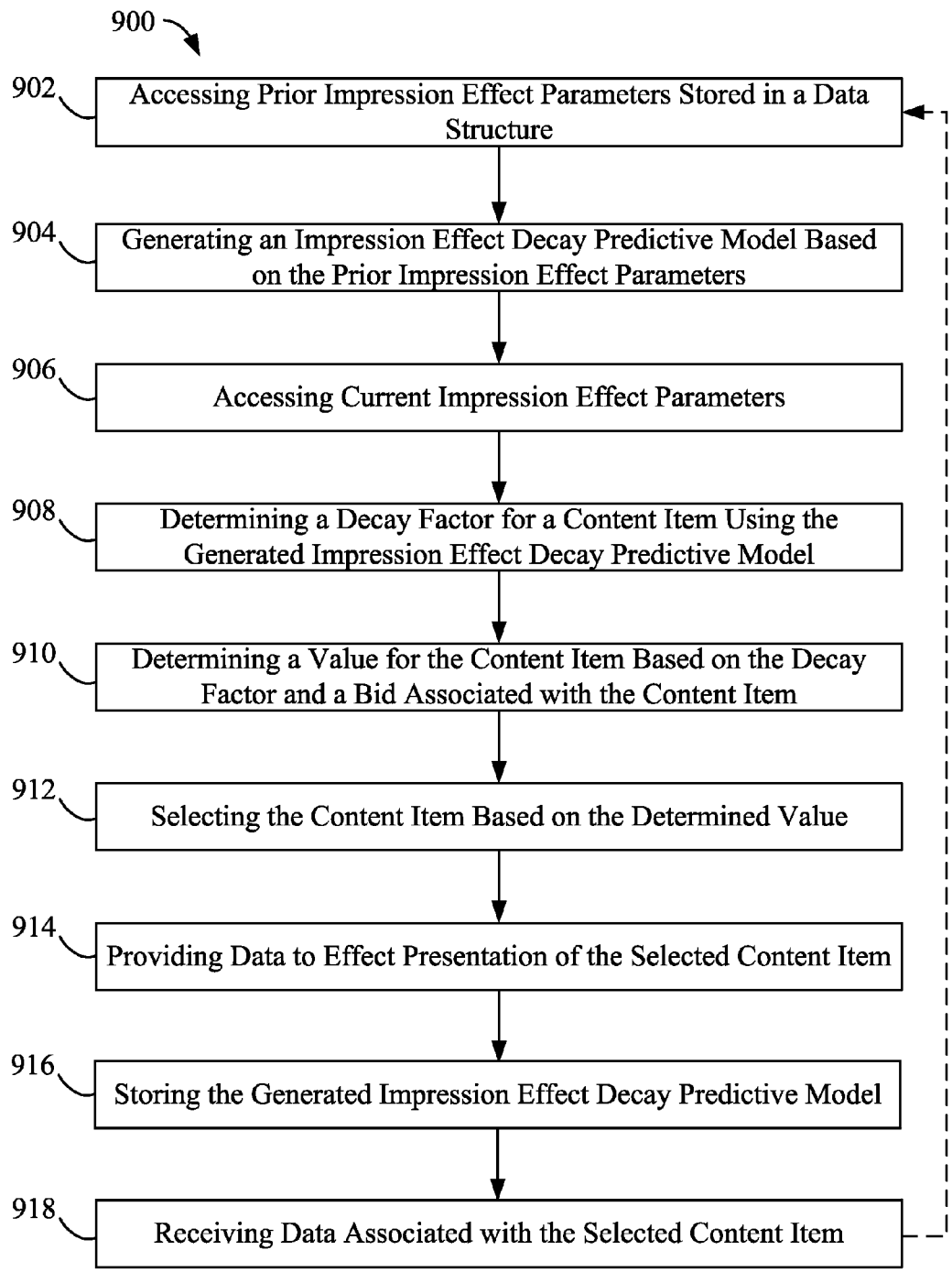
FIG. 9 is a flow diagram of another implementation of a process for using a predictive model to select a content item.

In some implementations, the predictive model module 152 may generate an impression decay predictive model prior to or during the process of selecting and serving a third-party content item to a client device. For example, FIG. 9 depicts an implementation of a process 900 in which the predictive model module 152 generates an impression effect decay predictive model, the generated impression effect decay predictive model is used in the selection of a content item, the generated impression effect decay model is stored, data associated with the selected content item is received. In the example of FIG. 9, the process 900 includes accessing prior impression effect parameters stored in a data structure (block 902). The accessing of the prior impression effect parameters may be performed in a substantially similar manner to that described in reference to block 702 of FIG. 7. The prior impression effect parameters may include parameters associated with prior content items, prior third-party content providers, prior resources, and/or prior publishers. Such prior impression effect parameters may include whether a client device performed a conversion action, prior device parameters, prior resource parameters, prior content item parameters, and/or temporal parameters associated with the client device as described herein.

An impression effect decay predictive model is generated by the predictive model module 152 based, at least in part, on the prior impression effect parameters (block 904). The generation of the impression effect decay predictive model may be performed in a substantially similar manner to that described in reference to block 704 of FIG. 7. The predictive model module 152 may generate the impression effect decay predictive model using a machine learning algorithm, such as a regression learning algorithm. Examples of such regression learning algorithms include perceptron linear learning, maximum entropy logistic regression, support vector machine (SVM) regression with maximum entropy gradient, descent least-squares stochastic gradient, etc. In some implementations, an impression effect decay predictive model may be generated for each content item, third-party content provider, campaign, resource, publisher, and/or client device.

Current impression effect parameters are received (block 906). The current impression effect parameters may be included in a content item request, such as content item request 602, received by the content item selection system 108. The current impression effect parameters may be parsed from the content item request to be used by the predictive model module 152. The current impression effect parameters from the content item request may include characteristics of the client device, a current client device context, a client device intention, an aggregate profile, and/or characteristics of a resource with which the content item is to be presented.

The current impression effect parameters may also be received for each content item included in an auction to be performed by the content item selection module 150. For example, each third-party content item may be associated with content item parameters and the third-party content provider parameters. Such parameters may include a category of the content item, one or more keywords associated with the content item, a format of the content item, a group of the content item, a campaign of the content item, an interactivity level of the content item, a popularity of the content item, a category of a third-party content provider associated with the content item, a type of a third-party content provider associated with the content item, a property of a third-party content provider associated with the content item, etc.

Using the current impression effect parameters and the generated impression effect decay predictive model, the predictive model module 152 determines a decay factor for a content item (step 908). The determination of the decay factor may be performed in a substantially similar manner to that described in reference to block 804 of FIG. 8. A value is determined for the content item based, at least in part, on the decay factor and a bid associated with the content item (block 910). The determination of the value may be performed in a substantially similar manner to that described in reference to block 806 of FIG. 8. The content item is selected based on the determined value (block 912). The selection of the content item may be performed in a substantially similar manner to that described in reference to block 808 of FIG. 8. Data to effect presentation of the selected content item (block 914) is provided by the content item selection system 108 to a client device and/or a resource server via the network 106. The providing of data to effect presentation of the selected content item may be performed in a substantially similar manner to that described in reference to block 810 of FIG. 8.

In some implementations, the generated impression effect decay predictive model may be stored (block 916). The generated impression effect decay predictive model may be stored in the predictive model database 180 with a unique identifier such that the predictive model may be identified and reused for a subsequent content item request. For example, if an impression effect predictive model is generated for each content item, third-party content provider, campaign, resource, publisher, and/or client device, then the stored predictive model may be accessed when the same content item, third-party content provider, campaign, resource, publisher, and/or client device is involved.

Data may be received by the content item selection system 108 that is associated with the selected content item (block 918). The data may include data indicative of a click on the selected content item, data indicative of a conversion action associated with the selected content item, data indicative of a viewing of the selected content item, etc. For example, a click on the selected content item by a user of a client device may cause the client device to provide data indicative of the click through the content item to the content item selection system 108. Such data may include a unique identifier associated with the content item, the client device, and/or the content item request that resulted in the selection and serving of the content item. The content item selection system 108 may store the data indicative of the click through in the historical database 160. The data indicative of the click through may be associated with the impression effect parameters for the selected content item such that the data of the historical database 160 adds the additional now-prior impression effect parameters for updating and refining the predictive model (shown by the return to block 902 in phantom). Thus, the impression effect decay predictive model may improve and "learn" the distribution of time after an initial impression that it takes for a user to engage with a content item.

Figure 10:
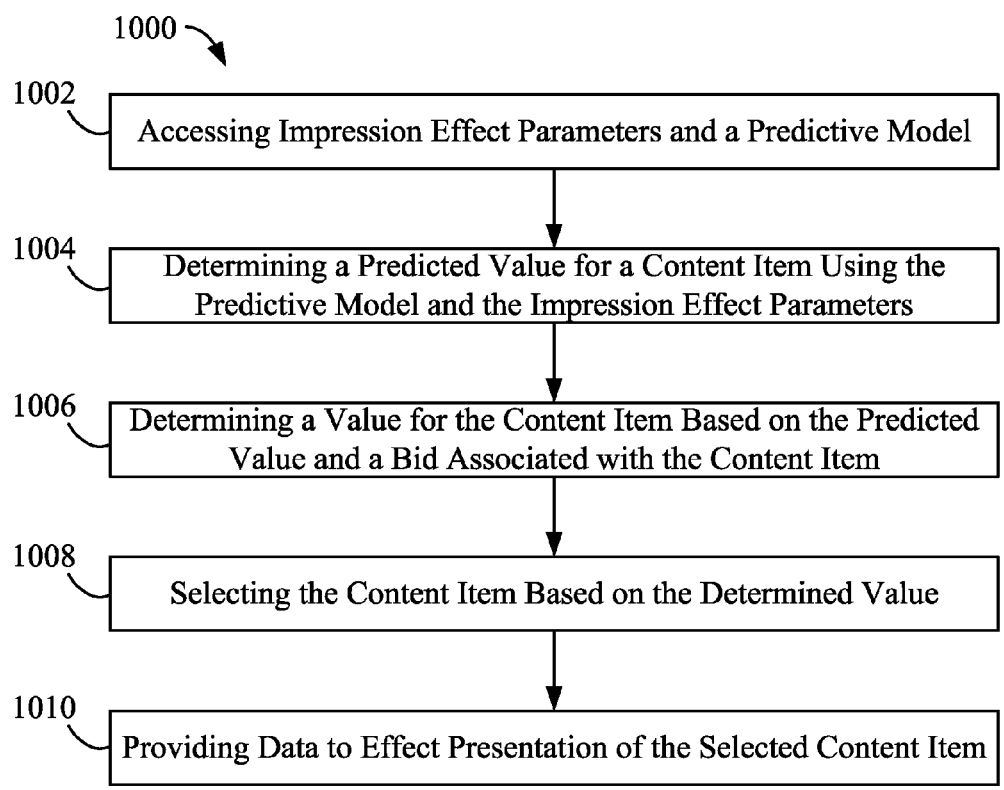
FIG. 10 is a flow diagram of yet another implementation of a process for using a predictive model to select a content item.

In some implementations, it may be preferable to incorporate the impression effect decay into another predictive model. For example, instead of outputting a decay factor to modify the score resulting from the bid and the predicted value, such as pCTR or pCVR, the impression effect decay may be incorporated into the predictive model that outputs the pCTR or pCVR value. That is, the pCTR predictive model or pCVR predictive model may be generated to utilize the impression effect decay to modify the outputted pCTR or pCVR value. FIG. 10 depicts an implementation of a process 1000 for integrating the impression effect decay into such existing predictive models. The process 1000 includes receiving impression effect parameters and a predictive model (block 1002). The receiving of impression effect parameters may be performed in a substantially similar manner to that described in reference to block 802 of FIG. 8. The predictive model module 152 may receive a predictive model, such as a pCTR predictive model or a pCVR predictive model from the predictive model database 180 with which to use the received impression effect parameters, amongst other parameters that may be used with the pCTR predictive model or pCVR predictive model. The pCTR predictive model or pCVR predictive model may be generated by the predictive model module 152 using prior impression effect parameters and other input parameters with click-through data and/or conversion data as the known output values.

A predicted value for a content item is determined using the predictive model and the impression effect parameters (block 1004). The received impression effect parameters are used as inputs to the predictive model, such as a pCTR or pCVR predictive model, to output a predicted value, such as a pCTR value or a pCVR value. The pCTR value is representative of the probability that a user of the client device will click on the content item based on the impression effect parameters and any other parameters for the pCTR predictive model. The pCVR value is representative of the probability that a user of the client device perform a conversion action in response to serving a content item based on the impression effect parameters and any other parameters for the pCVR predictive model.

A value for the content item is determined based, at least in part, on the predicted value and a bid associated with the content item (block 1006). The predicted value in the process of FIG. 10 incorporates in the impression effect decay. Thus, the content item selection module 150 may simply determine a value, such as a score, using the predicted value from the predictive model module 152, such as a pCTR value or pCVR value that incorporates in the impression effect decay, and a bid associated with the content item.

The content item is selected based on the determined value (block 1008). The content item may be selected by the content item selection module 150 based on an auction where scores are determined for each content item in the auction. The content item selection module 150 may select the content item associated with the highest determined value or score. In some implementations, each value or score is associated with a unique identifier for the associated content item. Based on the determined values, the content item selection module 150 may use the unique identifier associated with the highest determined value or score, in one implementation, to identify the selected content item associated with the highest determined value or score.

Data to effect presentation of the selected content item (block 1010) is provided by the content item selection system 108 to a client device and/or a resource server via the network 106. In some implementations, the content item selection module 150 may access the data to effect presentation of the selected content item from the content item database 170. The data to effect presentation of the selected content item may be accessed from the content item database 170 using the unique identifier associated with the selected content item. The data to effect presentation of the selected content item can include graphical data, textual data, image data, audio data, video data, etc. The client device receives the data to effect presentation of the selected content item and may display the selected content item on a display of the client device, such as those shown and described in reference to FIGS. 2-3.

In some implementations, a range of values for one or more impression effect parameters may be input into an impression effect decay predictive model to output a range of values. For example, if an impression effect decay predictive model is generated for a specific content item of a third-party content provider, a range of values for a single parameter, such as various aggregate profiles, categories of resources, etc., may be input into the predictive model while maintaining other impression effect parameters constant such that the range of values are outputted. The range of outputted values may be used to generate a graph, data table, or other data aggregation object for a third-party content provider to analyze how an impression effect decays relative to the selected parameter for the impression effect decay predictive model. The third-party content provider may use such outputted values to optimize a content item campaign, resources with which content items are presented, etc.

Figure 11:
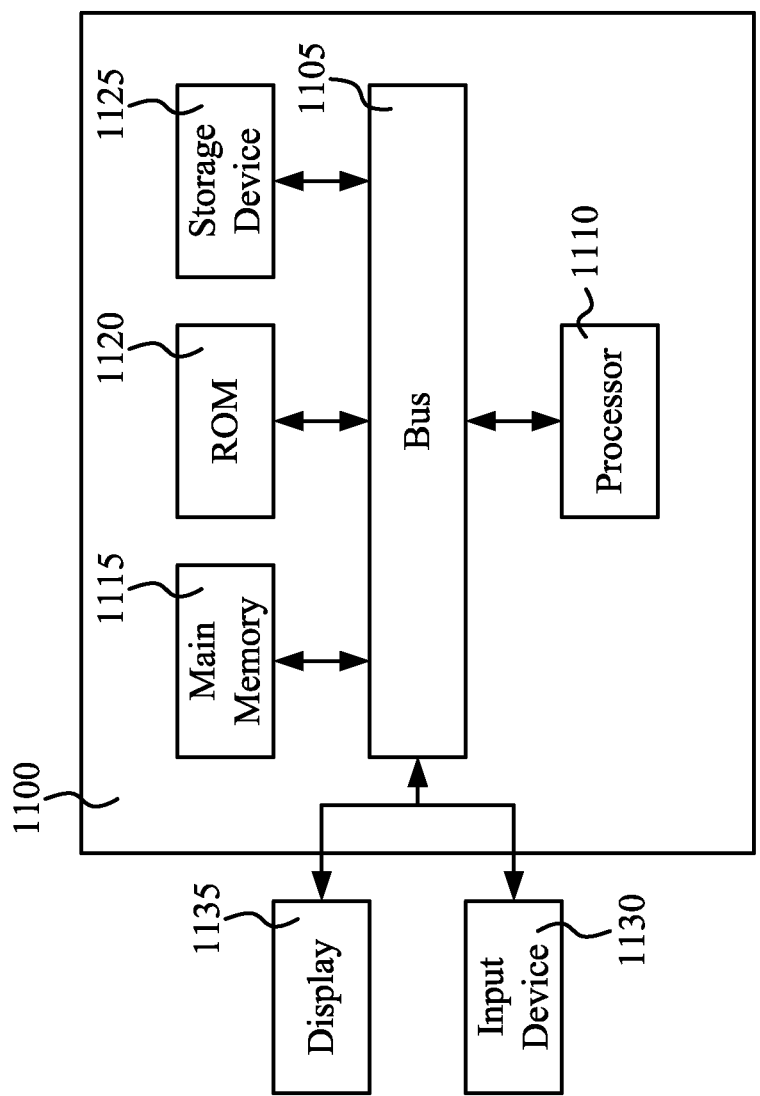
FIG. 11 is a block diagram depicting a general architecture for a computer system that may be employed to implement various elements of the systems and methods described and illustrated herein.

FIG. 11 is a block diagram of a computer system 1100 that can be used to implement the client device 110, content item selection system 108, third-party content server 102, resource server 104, etc. The computing system 1100 includes a bus 1105 or other communication component for communicating information and a processor 1110 or processing module coupled to the bus 1105 for processing information. The computing system 1100 can also include one or more processors 1110 or processing modules coupled to the bus for processing information. The computing system 1100 also includes main memory 1115, such as a RAM or other dynamic storage device, coupled to the bus 1105 for storing information, and instructions to be executed by the processor 1110. Main memory 1115 can also be used for storing position information, temporary variables, or other intermediate information during execution of instructions by the processor 1110. The computing system 1100 may further include a ROM 1120 or other static storage device coupled to the bus 1105 for storing static information and instructions for the processor 1110. A storage device 1125, such as a solid state device, magnetic disk or optical disk, is coupled to the bus 1105 for persistently storing information and instructions. Computing device 1100 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 1100 may be coupled via the bus 1105 to a display 1135, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 1130, such as a keyboard including alphanumeric and other keys, may be coupled to the bus 1105 for communicating information and command selections to the processor 1110. In another implementation, the input device 1130 may be integrated with the display 1135, such as in a touch screen display. The input device 1130 can include a cursor control, such as a mouse, a trackball, or cursor direction keys, for communicating direction information and command selections to the processor 1110 and for controlling cursor movement on the display 1135.

According to various implementations, the processes and/or methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes and/or method steps described herein. One or more processors in a multi-processing arrangement may also be employed to execute the instructions contained in main memory 1115. In alternative implementations, hard-wired circuitry may be used in place of or in combination with software instructions to effect illustrative implementations. Thus, implementations are not limited to any specific combination of hardware circuitry and software.

Although an implementation of a computing system 1100 has been described in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," "processing circuit," or "processing module" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method of selecting and serving a content item based on a decay of an impression effect for the content item, comprising:

accessing, by a processing module, one or more impression effect parameters representative of characteristics of a client device, an impression effect parameter of the one or more impression effect parameters indicating a historical engagement by the client device with the content item and including a determination that the client device performed a conversion action with the content item, the one or more impression effect parameters stored in a data structure;

determining, using a processing module, for the client device, a decay factor of the impression effect for the content item using an impression effect decay predictive model and using the impression effect parameter indicating the historical engagement by the client device with the content item with which the client device performed the conversion action;

determining, using a processing module, a value for the content item based, at least in part, on the decay factor and a bid associated with the content item with which the client device performed the conversion action;

selecting the content item with which the client device performed the conversion action based, at least in part, on the determined value for the content item with which the client device performed the conversion action; and providing data to effect presentation of the selected content item at the client device.

2. The method of claim 1, wherein the impression effect decay predictive model is configured to model the impression effect decay over a predetermined period of time.

3. The method of claim 1, wherein the value is a score based on the decay factor, the bid associated with the content item and a predicted value.

4. The method of claim 3, wherein the predicted value is a pCTR value or a pCVR value.

5. The method of claim 1, wherein the one or more impression effect parameters include one or more parameters associated with a current client device context.

6. The method of claim 1, wherein the one or more impression effect parameters include one or more parameters associated with the content item.

7. The method of claim 1, wherein the one or more impression effect parameters include one or more parameters associated with a resource with which the content item is to be presented.

8. The method of claim 1, wherein the historical engagement includes one or more impressions of the content item associated with the client device within a prior predetermined period of time.

9. The method of claim 1, wherein the one or more impression effect parameters include one or more parameters associated with an aggregate profile.

10. The method of claim 1, wherein the impression effect decay predictive model is generated using a regression learning algorithm.

11. The method of claim 1, wherein the characteristics of the client device include any of a type of client device, a display type of the client device, and a dimension of a display of the client device.

12. A system for serving content items in content item slots comprising:
one or more processing modules; and one or more storage devices storing instructions that, when executed by the one or more processing modules, cause the one or more processing modules to perform operations comprising:
accessing prior impression effect parameters stored in a data structure, wherein the prior impression effect parameters are representative of characteristics of a client device and the prior impression parameters include an impression effect parameter indicating a historical engagement by the client device with a content item and a determination that the client device performed a conversion action with the content item,
generating an impression effect decay predictive model based, at least in part, on the impression effect parameter indicating a historical engagement by the client device with the content item with which the client device performed the conversion action,
receiving one or more current impression effect parameters,
determining, for the client device, a decay factor of an impression effect for the content item using the generated impression effect decay predictive model and the impression effect parameter indicating the historical engagement by the client device with the content item with which the client device performed the conversion action,
determining a value for the content item with which the client device performed the conversion action based, at least in part, on the decay factor and a bid associated with the content item with which the client device performed the conversion action,
selecting the content item with which the client device performed the conversion action based, at least in part, on the determined value for the content item with which the client device performed the conversion action, and
providing data to effect presentation of the selected content item at the client device.

13. The system of claim 12, wherein the current impression effect parameters include one or more current parameters associated with a current client device context.

14. The system of claim 12, wherein the historical engagement includes one or more prior impressions of the content item associated with the client device within a prior predetermined period of time.

15. The system of claim 14, wherein the current impression effect parameters include one or more parameters associated with a resource with which the content item is to be presented and one or more parameters associated with the content item.

16. The system of claim 12, wherein the instructions cause the one ore more processing modules to perform operations further comprising:
storing the generated impression effect decay predictive model.

17. A computer readable storage device storing instructions that, when executed by one or more processing modules, cause the one or more processing modules to perform operations comprising:
accessing one or more impression effect parameters and a predictive model, each of the one or more impression effect parameters representative of characteristics of a client device and including a determination that the client device performed a conversion action with a content item, an impression effect parameter of the one or more impression effect parameters indicating a historical engagement by the client device with a content item with which the client device performed the conversion action;
determining, for the client device, a predicted value for the content item using the predictive model and using the received one or more impression effect parameters representative of characteristics of the client device and the impression effect parameter indicating the historical engagement by the client device with the content item with which the client device performed the conversion action;
determining a value for the content item with which the client device performed the conversion action based, at least in part, on the predicted value and a bid associated with the content item with which the client device performed the conversion action;
selecting the content item with which the client device performed the conversion action based, at least in part, on the determined value for the content item; and
providing data to effect presentation of the selected content item at the client device.

18. The computer readable storage device of claim 17, wherein the predicted value is a pCTR value or a pCVR value and wherein the predictive model is generated using a regression learning algorithm based, at least in part, on a historical engagement of the client device with the content item.

19. The computer readable storage device of claim 17, wherein the one or more accessed impression effect parameters include:
one or more parameters associated with the content item, one or more current parameters associated with a current client device context, and one or more parameters associated with a resource with which the content item is to be presented.

\* \* \* \* \*